(12) United States Patent
Lu

(10) Patent No.: US 7,157,825 B1
(45) Date of Patent: Jan. 2, 2007

(54) MOTOR

(76) Inventor: Yi-Tang Lu, No. 27, Fengshe Rd., Shengkang Hsiang, Taichung County (TW)

(*) Notice: Subject to any disclaimer, the term of this patent is extended or adjusted under 35 U.S.C. 154(b) by 0 days.

(21) Appl. No.: 11/156,622

(22) Filed: Jun. 21, 2005

(51) Int. Cl.
*H02K 5/00* (2006.01)

(52) U.S. Cl. .......................... 310/89; 310/91; 310/254

(58) Field of Classification Search ............ 310/89–91, 310/216–218, 254, 258
See application file for complete search history.

(56) References Cited

U.S. PATENT DOCUMENTS

| | | | | |
|---|---|---|---|---|
| 1,611,942 A | * | 12/1926 | Persons ....................... 310/258 |
| 2,245,433 A | * | 6/1941 | Delmonte .................... 310/258 |
| 4,972,113 A | * | 11/1990 | Newberg ..................... 310/217 |
| 5,852,338 A | * | 12/1998 | Boyd et al. ................... 310/89 |

* cited by examiner

*Primary Examiner*—Thanh Lam
(74) *Attorney, Agent, or Firm*—Rosenberg, Klein & Lee

(57) ABSTRACT

A motor includes a stator formed of a stack of silicon steel sheet members and a winding holder mounted inside the stack of silicon steel sheet members, axles inserted through the stator in four corners, front and back covers respectively covered on the front and back sides of the stator and engaged with the ends of the axles and affixed to the stator with screws, and a rotor supported between the front and back covers and suspending within the stator.

1 Claim, 4 Drawing Sheets

MOTOR

BACKGROUND OF THE INVENTION

1. Field of the Invention

The present invention relates to motors and more particularly, to a compact and inexpensive motor that dissipates heat quickly during operation.

2. Description of the Related Art

FIGS. 1 and 2 show a motor according to the prior art. According to this design, the motor 10 is comprised of an outer shell 11, a stator 12, a rotor 13, a front cover 14, and a back cover 15. The outer shell 11 has a plurality of radiation ribs 111 spaced around the periphery, and a plurality of screw holes 110 symmetrically formed in the two end walls. The stator 12 is fixedly mounted inside the outer shell 11, comprising a plurality of silicon steel sheet members 120 arranged in a stack, an electrically insulative winding holder 122 axially mounted in the stack of silicon steel sheet members 120, and an enameled wire 121 wound on the electrically insulative winding holder 122 to form windings around the inner diameter of the stack of silicon steel sheet members 120. The front and back covers 14 and 15 are respectively covered on the two distal ends of the outer shell 11, each having a center axle bearing 141, an annular locating flange 142 protruded from the inner wall around the center axle bearing 141 and fitted into the outer shell 11, and a plurality of mounting screw holes 140 respectively fastened to the screw holes 110 of the outer shell 11 with a respective screw. The rotor 13 is supported in the center axle bearings 141 of the covers 14 and 15 and suspending inside the outer shell 11 within the stator 12.

This design of motor 10 is still not satisfactory in function. The use of the outer shell 11 greatly increases the dimensions of the motor 10 and complicates the fabrication of the motor 10, resulting in a high manufacturing cost. Further, because the stator 12 is mounted inside the outer shell 11, heat produced by the silicon steel sheet members 120 during operation of the motor 10 is dissipated into the outside air through the radiation ribs 111 of the outer shell 11, i.e., the silicon steel sheet members 120 cannot receive cooling air to dissipate heat efficiently. Because of poor heat dissipation effect, this design of motor 10 is not durable in use.

SUMMARY OF THE INVENTION

The present invention has been accomplished under the circumstances in view. It is therefore one object of the present invention to provide a motor, which saves much material, thereby reducing the manufacturing cost. It is another object of the present invention to provide a motor, which dissipates heat quickly during operation. To achieve these and other objects of the present invention, the motor comprises a stator, the stator having a plurality of axle holes extending through front and back sides thereof and a plurality of screw holes symmetrically formed in the front and back sides; a plurality of axles respectively inserted through the axle holes of the stator, the axles each having two ends respectively extending out of the front and back sides of the stator; two covers respectively attached to the front and back sides of the stator, the covers each having an inner side, an outer side opposite to the inner side, a plurality of locating holes formed in the inner side and adapted to receive the ends of the axles, an axle bear extending through the inner side and the outer side at the center, and a plurality of mounting screw holes extending through the inner side and the outer side corresponding to the screw holes of the stator; a plurality of tie screws respectively threaded into the mounting screw holes of the covers and the screw holes of the stator to affix the covers to the stator; and a rotor supported in the axle bearings of the covers and suspending within the stator. Because the motor eliminates the use of an outer shell, the dimensions and weight of the motor are greatly reduced, and heat can quickly be dissipated into the outside open air during the operation of the motor.

DESCRIPTION OF THE RELATED ART

DETAILED DESCRIPTION OF THE PREFERRED EMBODIMENT

Figure 1:
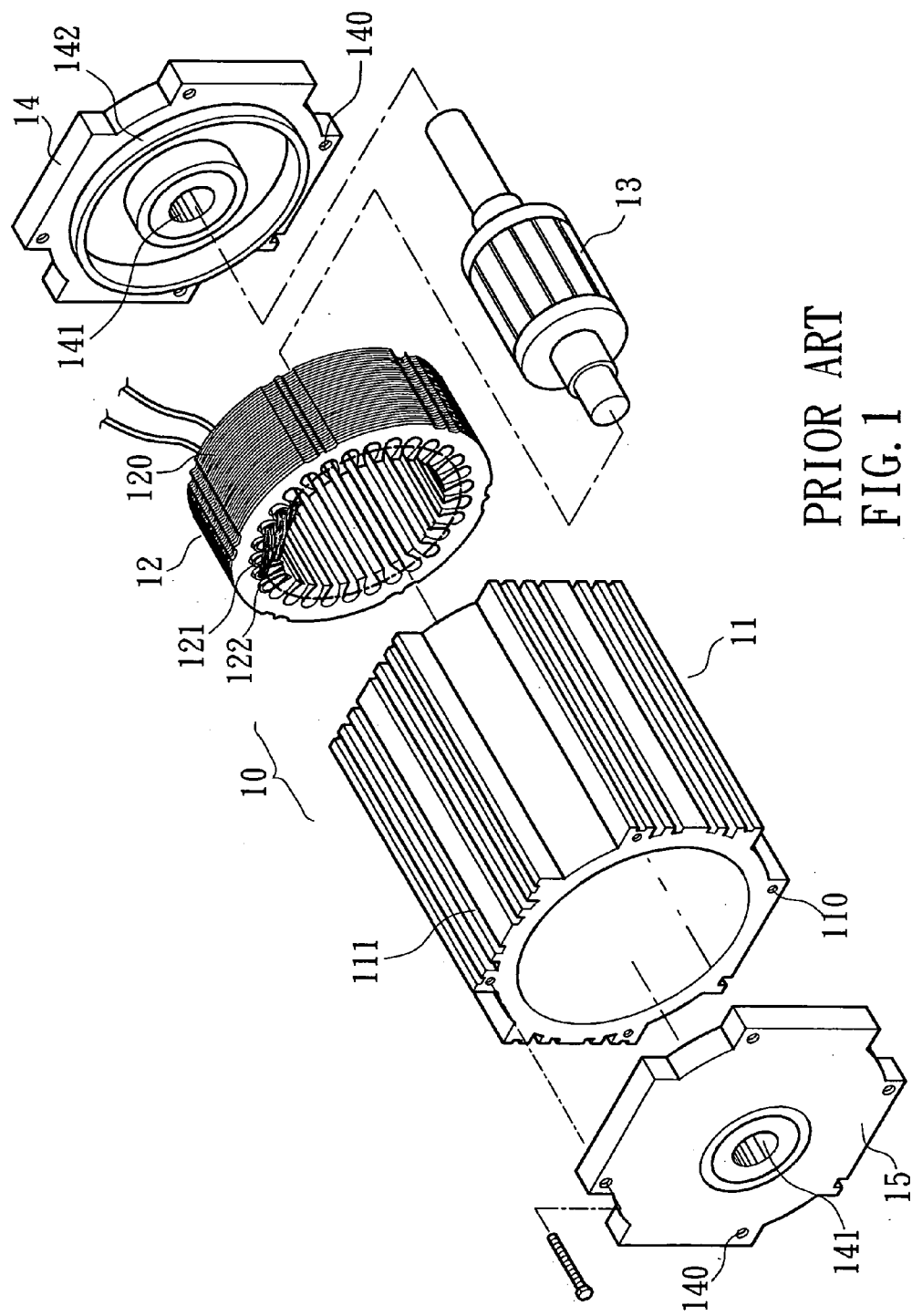
FIG. 1 is an exploded view of a motor according to the prior art.
Figure 2:
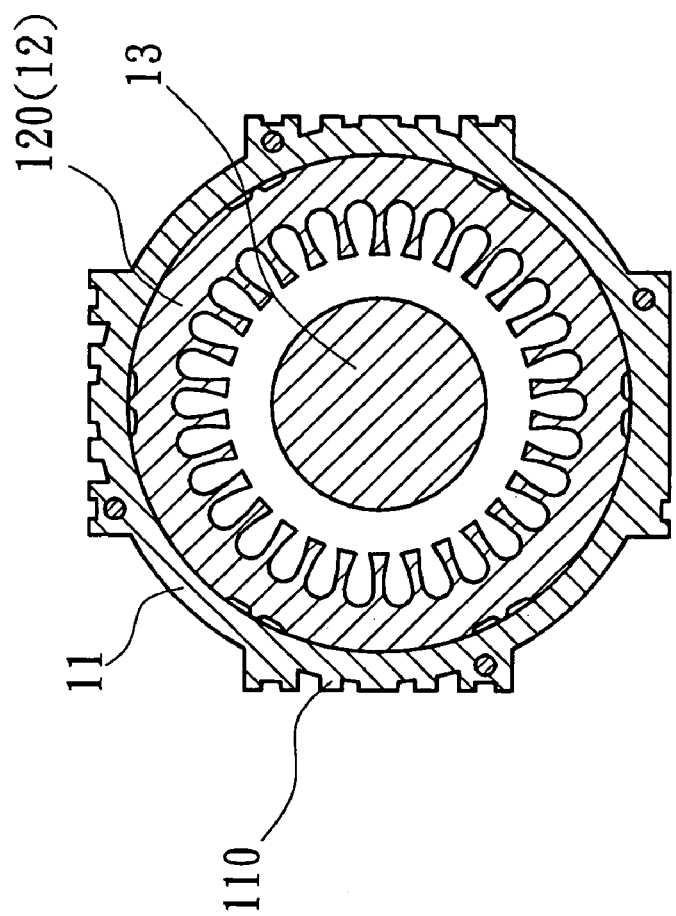
FIG. 2 is a cross sectional view of the motor according to the prior art.
Figure 3:
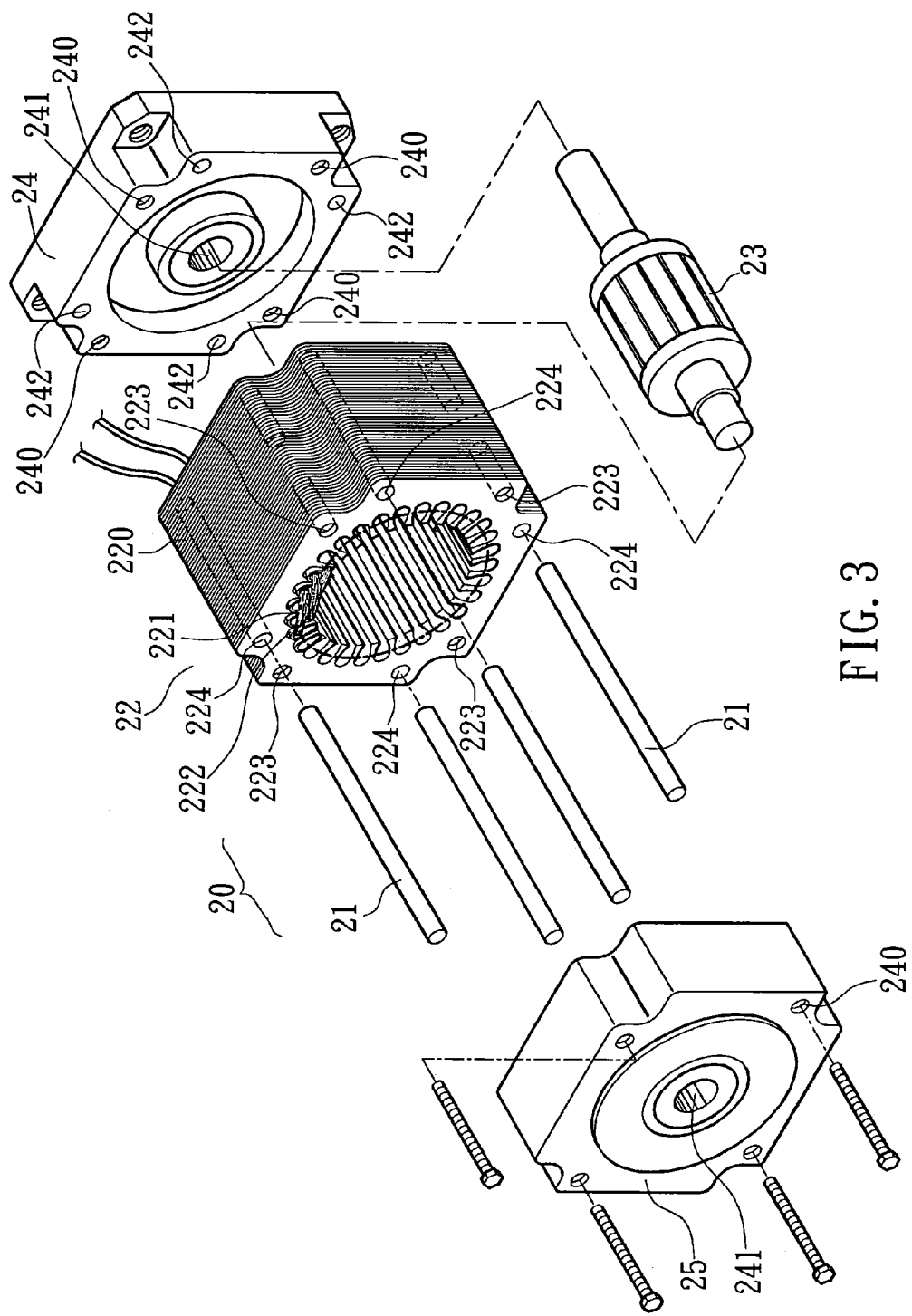
FIG. 3 is an exploded view of a motor according to the present invention.
Figures 4A, 4B:
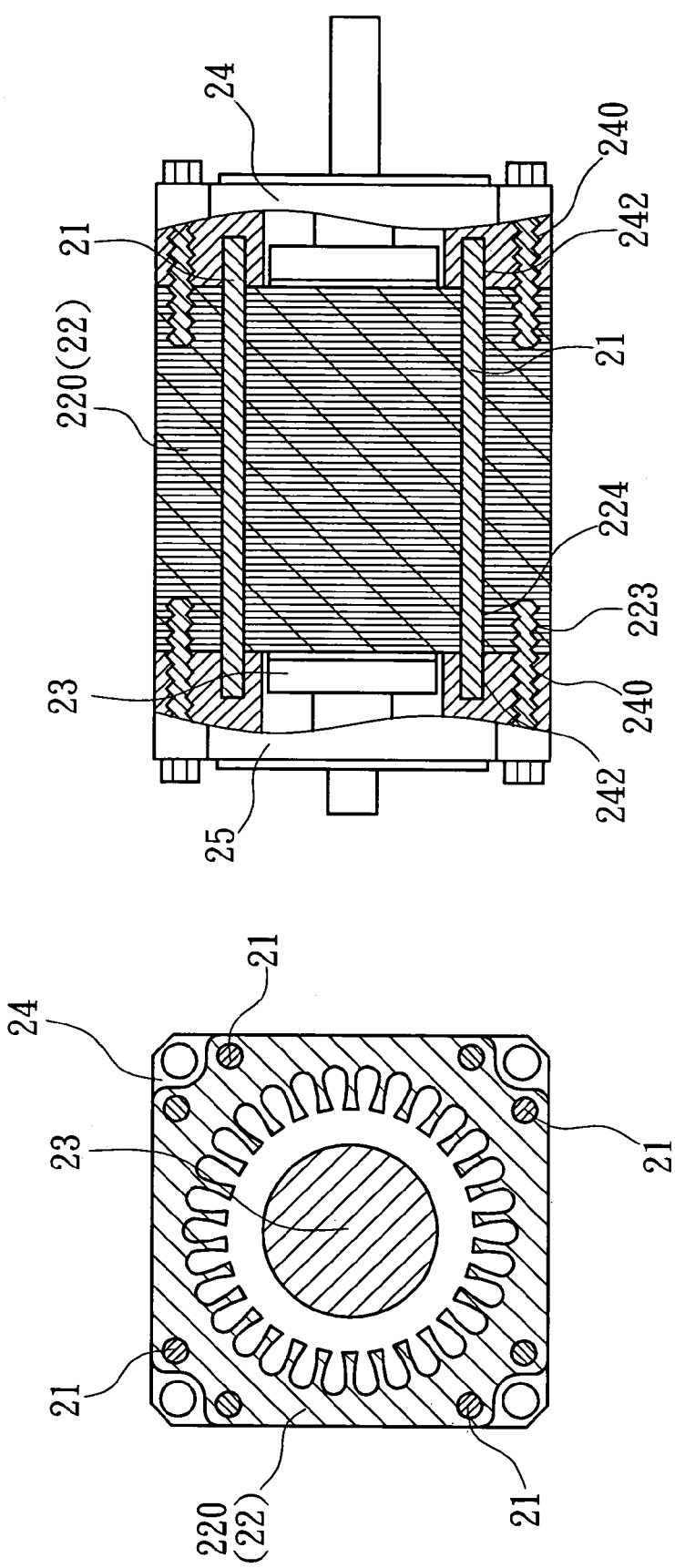
FIG. 4A is a cross sectional view of the motor according to the present invention.
FIG. 4B is a longitudinal view in section of the motor according to the present invention.

Referring to FIGS. 3, 4A and 4B, a motor 20 in accordance with the present invention is shown comprised of a stator 22, a rotor 23, a front cover 24, and a rear cover 25.

The stator 22 is comprised of a plurality of silicon steel sheet members 220 made subject to a predetermined pattern and arranged in a stack, an electrically insulative winding holder 222 axially mounted in the stack of silicon steel sheet members 220, and an enameled wire 221 wound on the electrically insulative winding holder 222 to form windings around the inner diameter of the stack of silicon steel sheet members 220. The stator 22 has a plurality of axle holes 224 axially extending through the front and back sides, and a plurality of screw holes 223 respectively symmetrically formed in the front and back sides.

The front cover 24 and the back cover 25 each have an axle bearing 241 at the center, and a plurality of locating holes 242 respectively formed in the respective inner wall corresponding to the axle holes 224 of the stator 22, and a plurality of mounting screw holes 240 respectively extending through the respective inner and outer walls corresponding to the screw holes 223 of the stator 22.

During installation, round axles 21 are respectively inserted through the axle holes 224 of the stator 22, and then the rotor 23 is inserted through the stator 22 and suspending within the electrically insulative winding holder 222 with the two ends of the shaft thereof respectively supported in the axle bearings 241 of the front and back covers 24 and 25, and then the front cover 24 and the back cover 25 are respectively covered on the front and back side of the stator 22 to force the locating holes 242 into engagement with the ends of the axles 21 respectively, and then screws are respectively threaded into the mounting screw holes 240 of the covers 24 and 25 and the screw holes 223 of the stator 20 to affix the covers 24 and 25 and the stator 22 firmly together, keeping the rotor 23 suspending between the covers 24 and 25 within the electrically insulative winding holder 222 (the windings of the enameled wire 221) of the stator 22. Further, gaskets may be mounted in between the covers 24 and 25 and the stator 22 to seal out outside water. Further, the silicon steel sheet members 220 are respectively electrically insulated from one another. The electrically insulative winding holder 222 prevents direct contact of the silicon steel sheet members 220 with the windings of the enameled wire 221. Because the silicon steel sheet members 220 are simply used to match with the windings of the enameled wire 221 for producing magnetic force, electric current is not connected to the silicon steel sheet members 220. Therefore, touching the silicon steel sheet members 220 during operation of the motor 20 does not cause an electric shock.

As indicated above, the invention provides a motor that has the following advantages:

1. Because no outer shell is used, the invention saves much material.

2. Because no outer shell is needed, the gravity weight and dimensions of the motor are greatly reduced.

3. Because the silicon steel sheet members of the stator are exposed to the outside open air, heat can quickly be dissipated into the outside open air during operation of the motor.

4. Because the front and back covers are respectively supported on the ends of the axles that are inserted through the respective axle holes of the stator and screws are respective threaded into the respective mounting screw holes of the front and back covers and the respective screw holes at the front and back sides of the stator, the whole assembly of the motor is steady.

5. Because the axles are inserted through the respective axle holes in the four corners of the stator and engaged in the respective locating holes at the front and back covers, the stator is prohibited from displacement relative to the front and back covers.

Although a particular embodiment of the invention has been described in detail for purposes of illustration, various modifications and enhancements may be made without departing from the spirit and scope of the invention. For example, instead of the design of the axle holes at the stator and the locating holes at the front and back covers and the use of the respective axles, the stator can be made having plugs (or plugholes) at the front and back sides for engagement with respective plugholes (or plugs) at the front and back covers. Accordingly, the invention is not to be limited except as by the appended claims.

The invention claimed is:

1. A motor comprising:
   a stator, said stator having a plurality of axle holes extending through front and back sides thereof and a plurality of screw holes symmetrically formed in the front and back sides;
   a plurality of axles respectively inserted through said plurality of axle holes of said stator, said axles each having two opposing ends respectively extending out from the front and back sides of said stator;
   two covers respectively attached to the front and back sides of said stator, each of said covers having an inner side, an outer side opposite to said inner side, a plurality of locating holes formed in said inner side and adapted to receive the extending ends of said axles therein, an axle bearing extending through said inner side and said outer side at a central portion thereof, and a plurality of mounting screw holes extending through said inner side and said outer side corresponding to the screw holes of said stator;
   a plurality of tie screws respectively threaded into the mounting screw holes of said covers and the screw holes of said stator to affix said covers to said stator; and
   a rotor supported in the axle bearings of said covers and suspending within said stator.

* * * * *